United States Patent
Tixier

[11] 3,738,225
[45] June 12, 1973

[54] METHOD FOR MACHINING GROOVES AND GEAR TEETH

[75] Inventor: Michel Tixier, Billancourt, France

[73] Assignee: Regie Nationale Des Usines Renault, Billancourt, France

[22] Filed: June 12, 1970

[21] Appl. No.: 45,765

[30] Foreign Application Priority Data
June 16, 1969 France............................ 6919905
May 8, 1970 France............................ 7016903

[52] U.S. Cl. ............................. 90/3, 90/7, 90/8, 90/4, 90/11 C
[51] Int. Cl. ............................................ B23f 9/20
[58] Field of Search ............................ 90/3, 8, 7, 4

[56] References Cited
UNITED STATES PATENTS

| | | | |
|---|---|---|---|
| 3,595,130 | 7/1971 | Maker | 90/3 |
| 1,516,524 | 11/1924 | Fellows | 90/3 |
| 3,099,939 | 8/1963 | Haase et al. | 90/3 |
| 1,583,790 | 5/1926 | Green | 90/8 |
| 2,102,659 | 12/1937 | Wildhaber | 90/4 |

*Primary Examiner*—Andrew R. Juhasz
*Assistant Examiner*—Z. R. Bilinsky
*Attorney*—Stevens, Davis, Miller & Mosher

[57] ABSTRACT

Method of machining grooves with shape outline by removal of material, more particularly for making gears, characterized in that the feed movement of the tool penetrating into the workpiece is so adjusted that one of the tool flanks penetrates into the workpiece tangentially to the corresponding lateral contour to be obtained in said workpiece, only the opposite flank and the front face of the tool being used for removing material from the workpiece.

3 Claims, 39 Drawing Figures

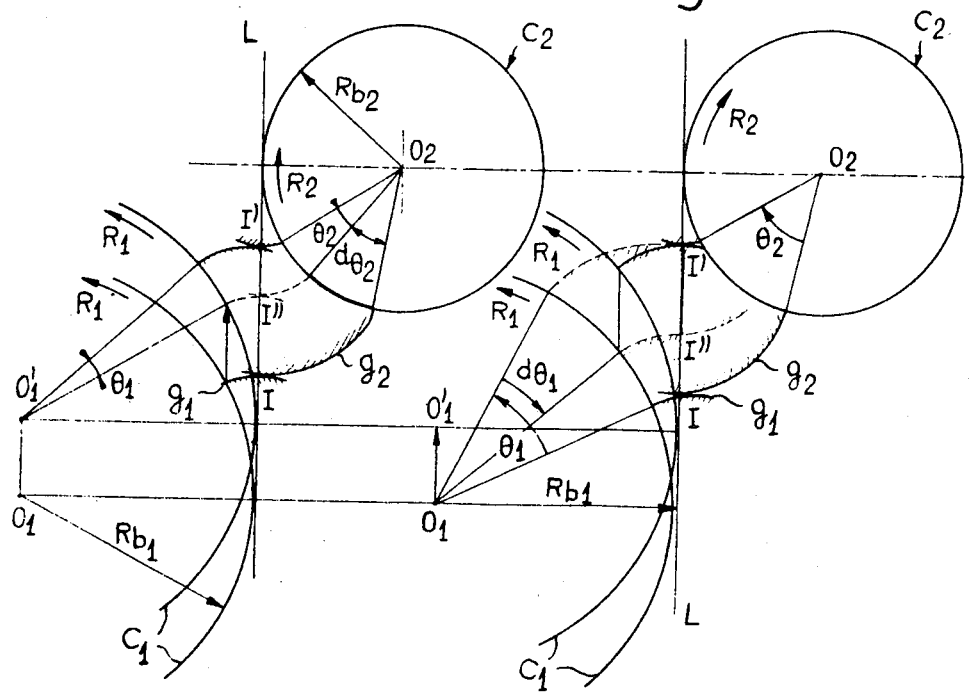
Fig. 26    Fig. 27
Fig. 28    Fig. 29
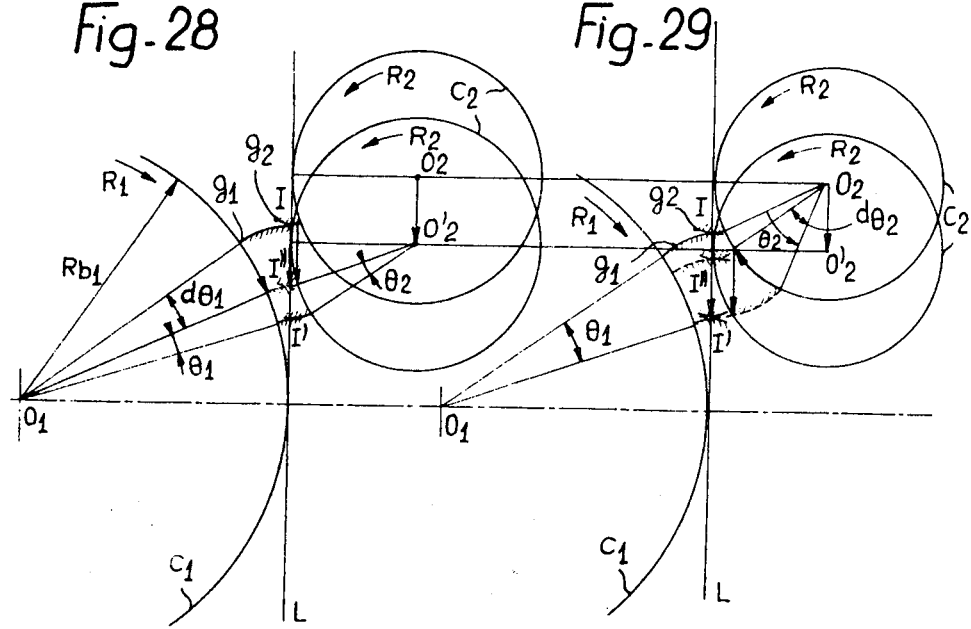

METHOD FOR MACHINING GROOVES AND GEAR TEETH

The present invention relates to a method of machining, by cutting, grooves having a predetermined outline or contour, such as shaft splines, engagement dog teeth of transmission mechanisms, gears, racks, etc. as currently and widely used in the mechanical industries.

More generally, the method of this invention is applicable to any concave shape generated by the linear displacement of a constant outline obtained by removing material by means of a tool according to this linear displacement in relation to the workpiece, said tool being fed gradually towards the workpiece with a dipping movement of predetermined orientation.

The machining of such grooves, whether by the milling process, the mortise-cutting process or the slotting process, with or without generating movement, is performed by producing a gradual penetration or dip-cutting movement of the tool into the workpiece.

This penetration takes place as a rule along the axial plane of the groove to be cut, so that in the case of a machining operation performed by using chip-producing cutting tools comprising front edges prolonged by two lateral edges material is removed on the three faces, namely the front face and the two flanks, thus forming a characteristic chip having three convergent arms which is a current cause of stuffing or jamming, making it difficult to evacuate the chip and constituting a major cause of rapid tool wear. This technique is widespread nowadays, in spite of the difficulty of properly evacuating the chip thus formed, as the tool operates simultaneously with three cutting edges. As a result, the surface condition of the machined part is also impaired.

This rapid tool wear constitutes the chief inconvenience preventing a normal development of mass production, for example in the cutting of gears for the automotive industry, since such production requires a frequent replacement of expensive tools on machines having a relatively high production rate.

Attempts have been made with a view to improve cutting conditions by providing tools of which the teeth have a preferential orientation, each tooth cutting by turns one and then the other side. Multiple teeth tools with a progressive outline have also been proposed, which produced chips having a shape adapted to facilitate the cutting process and therefore to reduce wear while preserving a relatively high rate of metal cutting.

Another attempt consisted in reducing overheating due to chip friction by using chip-breaking clearances, in order to accelerate the removal and discharge of chips.

Positive yet partial results have been obtained with these various methods, for the gains obtained from the stand-point of wear and performance improvements are attenuated by the sometimes considerable increase in tool cost and sharpening operations.

Moreover, a poor surface finish makes it necessary in very frequent instances for the use of additional finishing operations by grinding or shaving.

It is the essential object of the machining process according to this invention to modify the direction of feed of the tool penetrating into the workpiece by combining its conventional forward feed with an adjustable lateral feed so that one of the tool flanks will penetrate tangentially to the corresponding outline to be obtained in the workpiece which it will gradually envelope during its feed. As a result, material will be removed chiefly by the front face and the opposite side face of the tool.

According to a modified form of embodiment of this invention, the direct dip-cutting movement, in conjunction with, or without a workpiece-tool generating movement, is conjugated with an additive differential movement of rotation or translation adapted to continuously modify the direction of the dip-cutting movement into the workpiece, by means of either a differential system coupled to the kinematic chain of the machine, or an independent movement produced by an additional motor actuating either the tool or the workpiece.

In this last case the flank cut directly by the tool may if desired be recut during a finishing pass obtained by producing a movement in the opposite direction with respect to the programmed differential movement.

This arrangement for machining on a single flank and the front face reduces considerably the frictional contact and therefore the overheating along the cutting edge of the tool. The chip is formed under the same conditions as in conventional machining, by using side-cutting tools. As a result, the useful life of these tools is increased considerably, in spite of the larger quantity of metal removed thereby.

The absence of heeling and chatter, as a result of flank cutting, leads to an improved surface finish (reduction of chip tearing) so that cutting times can be reduced while improving cutting conditions.

Besides, cutting only with the flank and the front face permits a greater latitude in the sharpening of the cutting edges and in the tool clearance, and affords the most favorable chip-forming configuration.

This method is applicable to a wide range of cutting machines and methods, notably to the machining without any generating movements such as shape milling, slotting and broaching, and also to machining processes with hob generation or shaping-tool generation.

It is not incompatible with abrasion machining methods, although these are less developed in this field, in the present state of the gear cutting technique.

An important application of the present process to the machining by means of hobs operated under dip-feed or dip-cutting conditions is attended by shorter cutting times.

More particularly, hitherto known gear cutting processes are either of the front penetration type (by variation of the distance between the centers of the tool and workpiece) or of the dip-cutting type with differential rotational movement between the tool and workpiece, a fixed shift between the tool in workpiece axes is relation to the direction of the dipping movement, which is referred to herein as the "set", ensuring a substantial improvement in the tool to workpiece clearance conditions. This set constitutes a parameter of the tool cutting requirements in conventional cutting processes.

For a given set, the variation in the dip-cutting movement in relation to the differential tool to workpiece rotation associated therewith describes a curve characteristic of the cutting conditions and of their variations during the machining operation.

With the method of this invention, in case the lateral surfaces to be machined have the contours of involute curves, the dip-cutting movement is contemplated parallel to the tangent common to the base circles of the tool and workpiece, and the movement of the tool away from the workpiece is to take place at right angles or obliquely in relation to said tangent.

Another provision characterizing this invention, in the case of a tangential penetration dip-cutting operation according to this method for cutting gear teeth having the contour of an involute curve, consists in effecting a constant dip-cutting movement under the above-defined conditions, with a differential rotational movement proportional to the dip-cutting movement.

This provides a constant ratio of the dip-cutting movement to the additional tool to workpiece rotation, and a linear resultant characteristic curve.

Since under these conditions the movements are reduced to constant speeds of rotation and translation and to rectilinear feeds, this method affords a considerable simplification in the kinematic chains of the machine-tools. These provisions, in conjunction with the substantial improvements in the cutting conditions due to the tangential penetration, as already explained hereinabove, lead to a considerable increase in cutting efficiency and economy.

If the teeth outlines are other than involute curves, the absence of base circles leads to a machining line of action having a variable direction. In this case the machining by tangential penetration will be obtained according to another arrangement consisting of varying the above-defined set as a function of the cutting conditions by tangential penetration and also of the outline or contour to be obtained, given a constant tool dipping movement and constant tool-to-workpiece rotational speeds. In this case the machine design remains likewise extremely simple, the set variation control being obtained simply and with the desired precision, so that this construction is characterized by the same advantageous features as in the case of gear teeth having an involute curve contour.

This invention is also concerned with machine-tool arrangements designed for advantageously carrying out the dip-cutting method set forth hereinabove.

This method and the various machine arrangements contemplated for carrying out same will now be described in detail by way of example, with reference to the attached drawing, in which.

Figure 17:
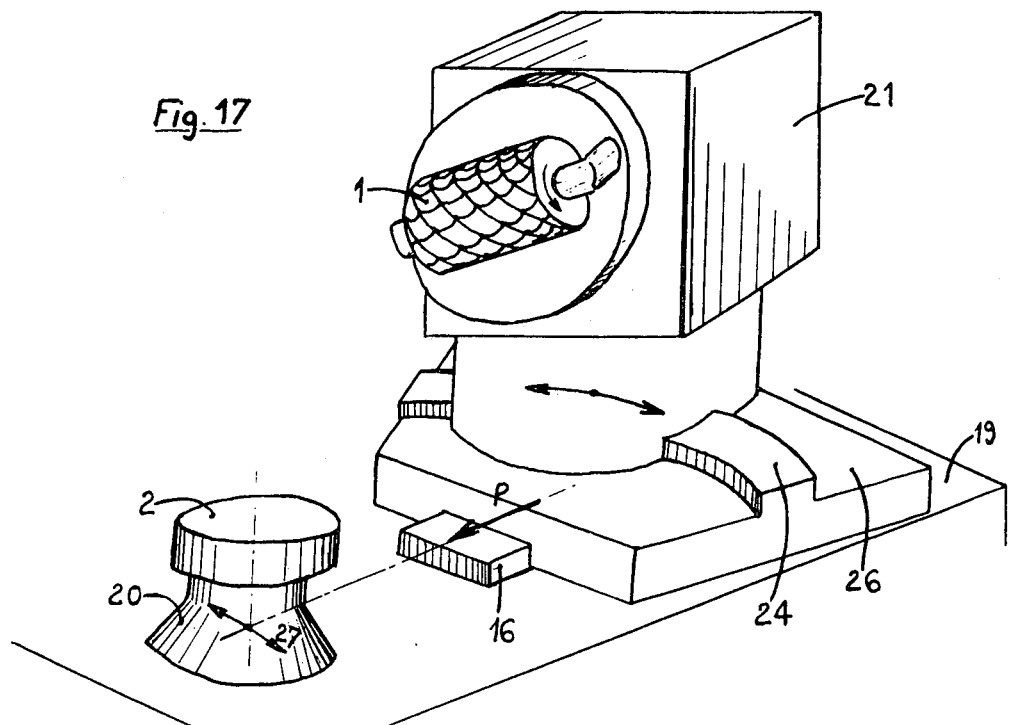
Figure 18:
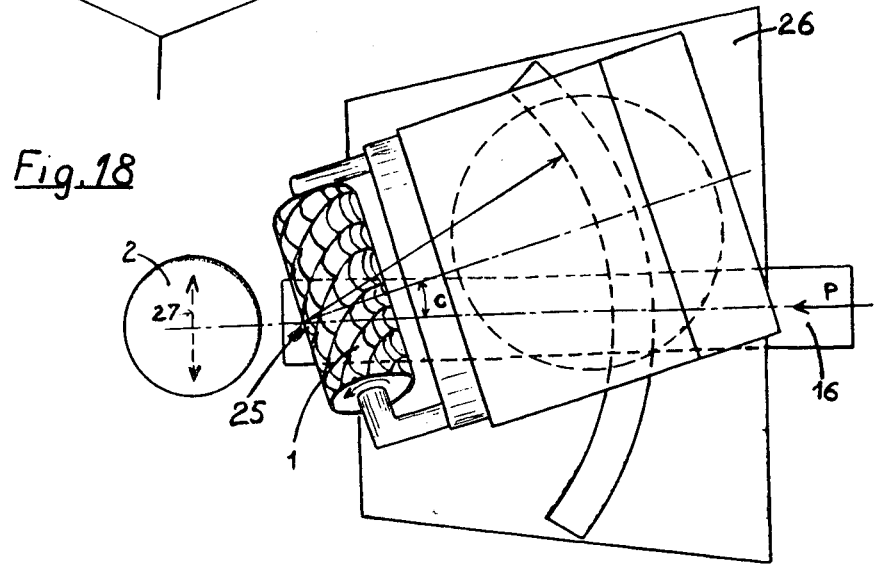
Figure 19:
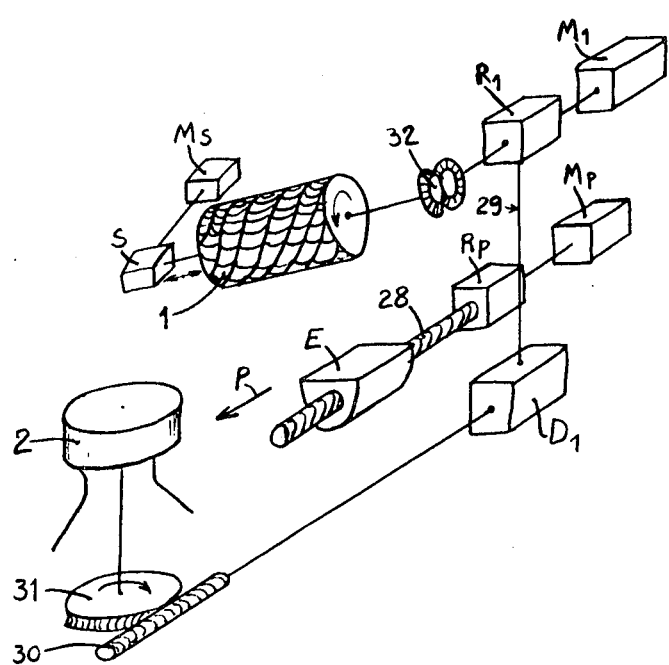
Figure 20:
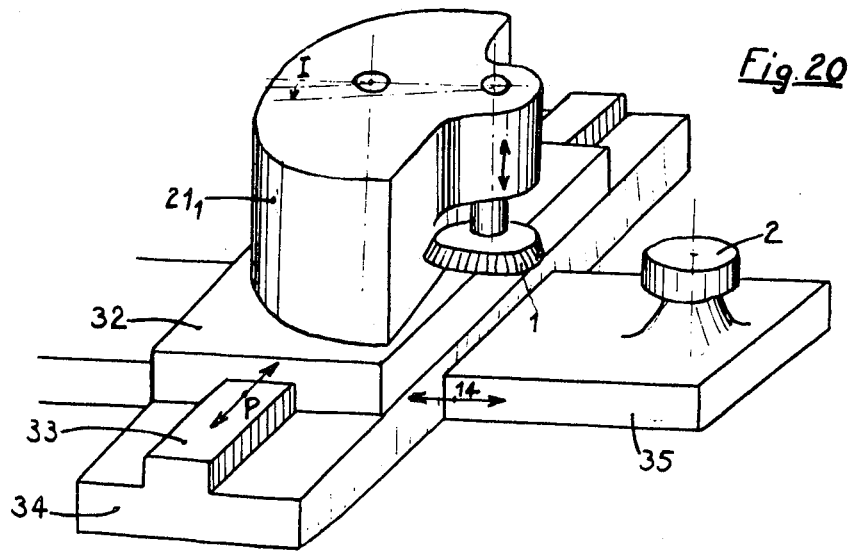
Figure 21:
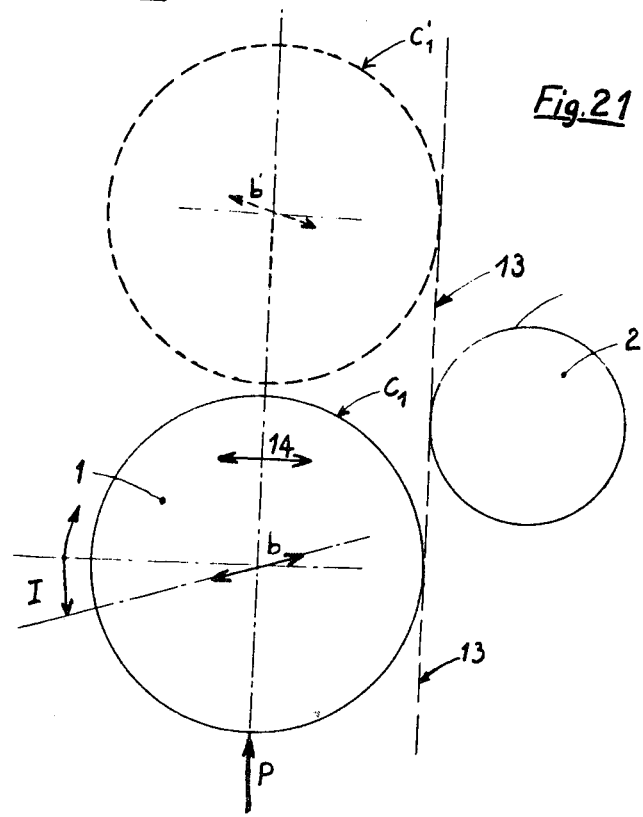
Figure 22:
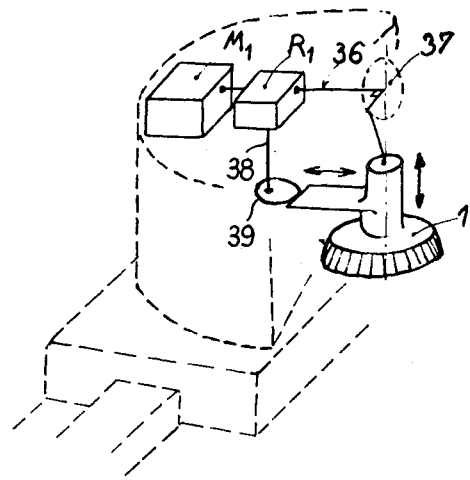
Figure 23:
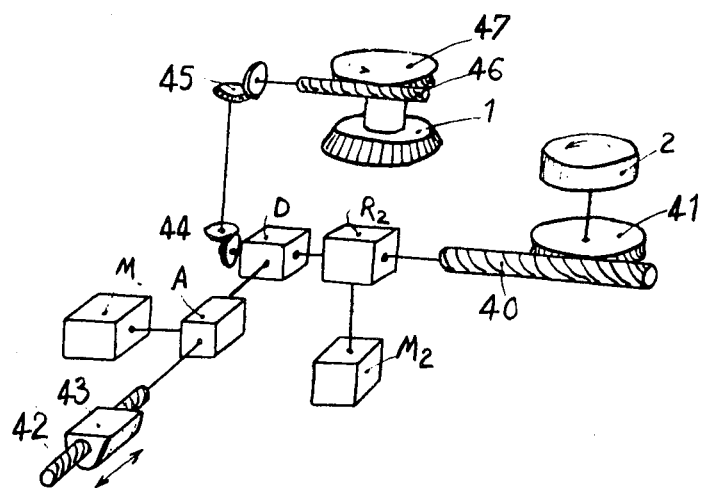
Figure 24:
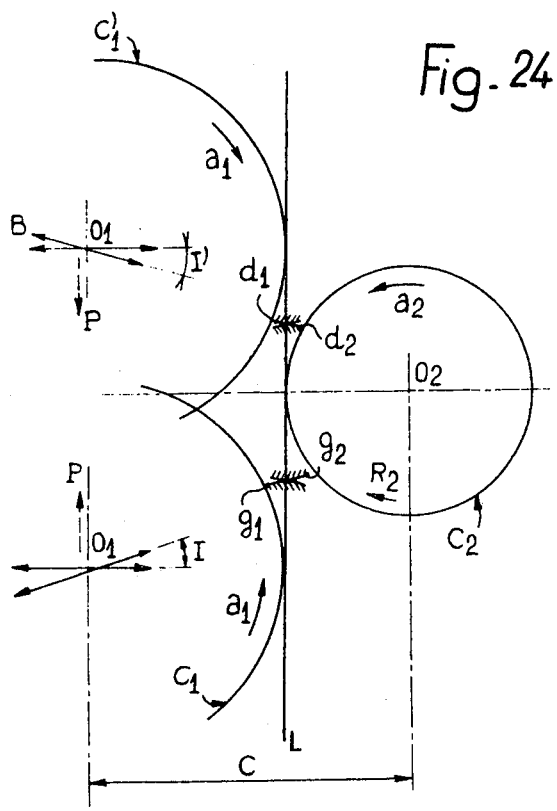
Figure 25:
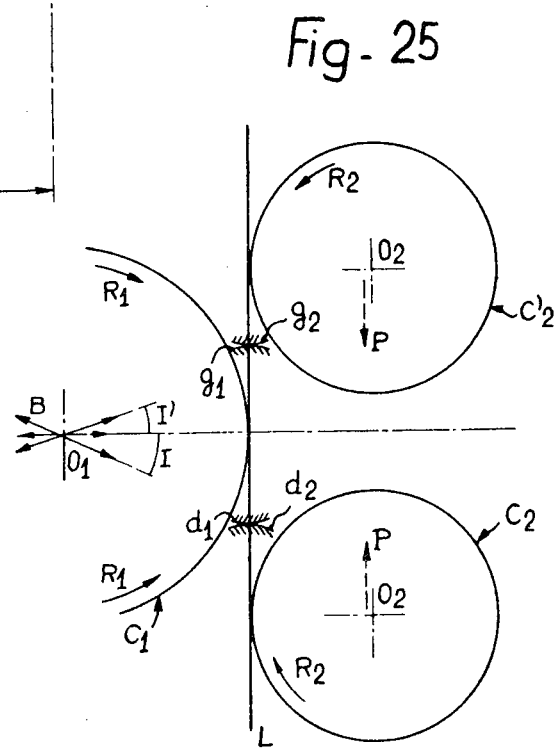
Figure 30:
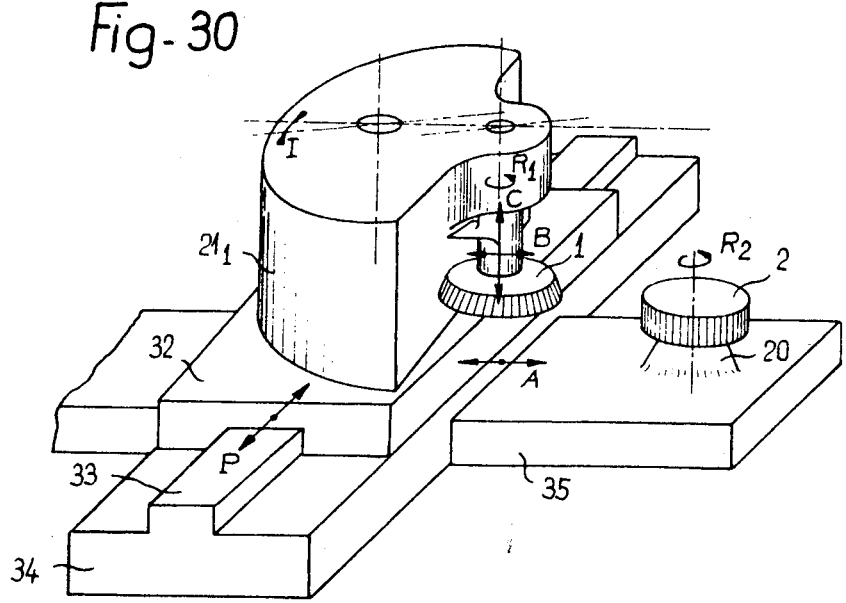
Figure 31:
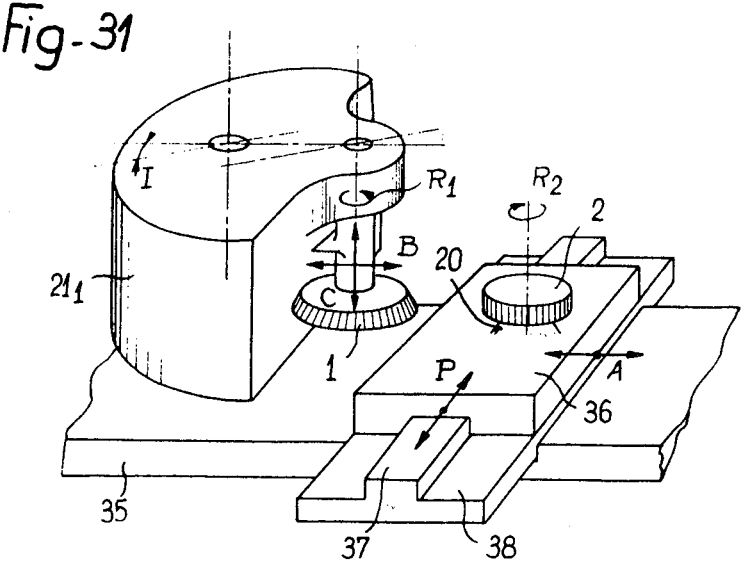
Figure 32:
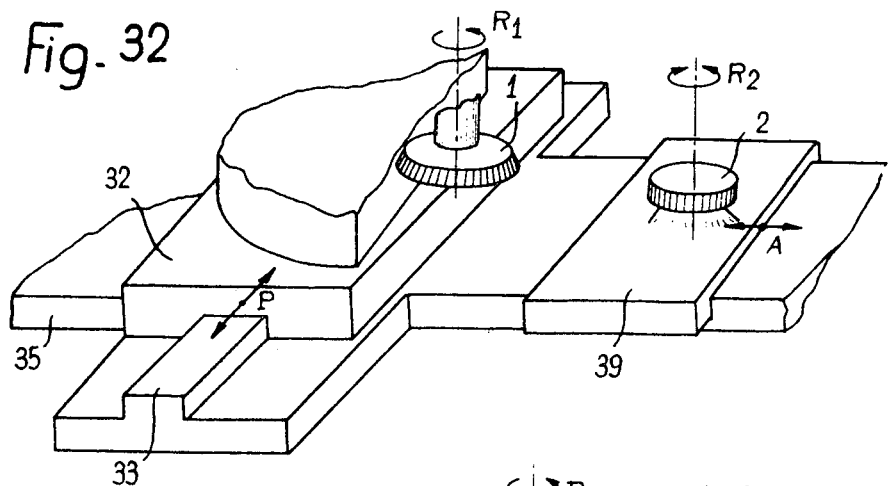
Figure 33:
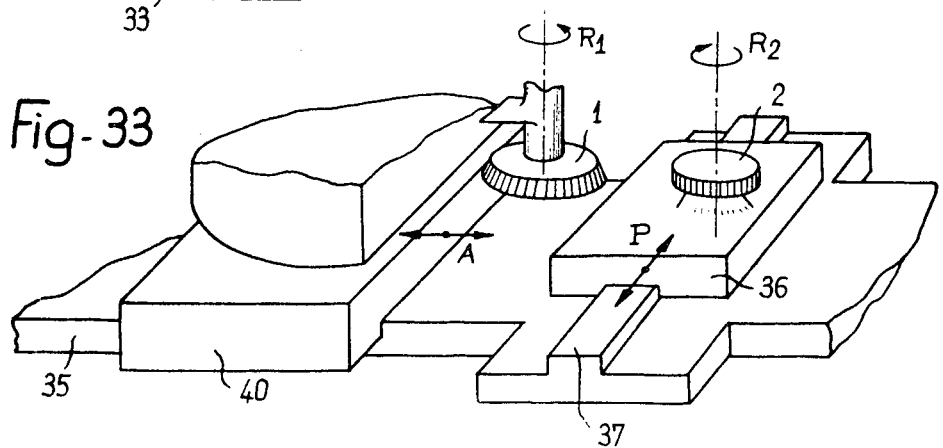
Figure 34:
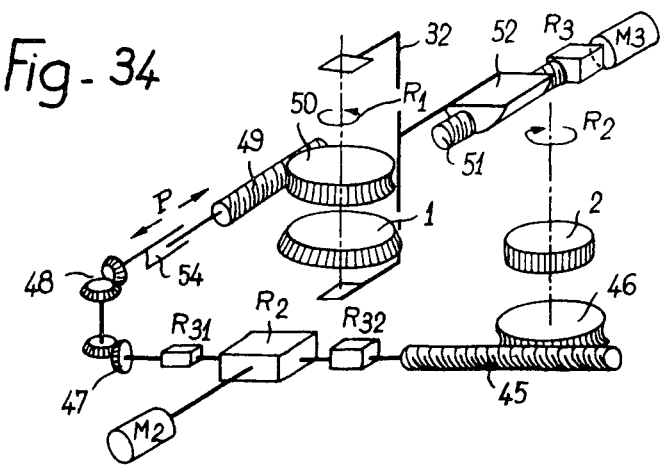
Figure 35:
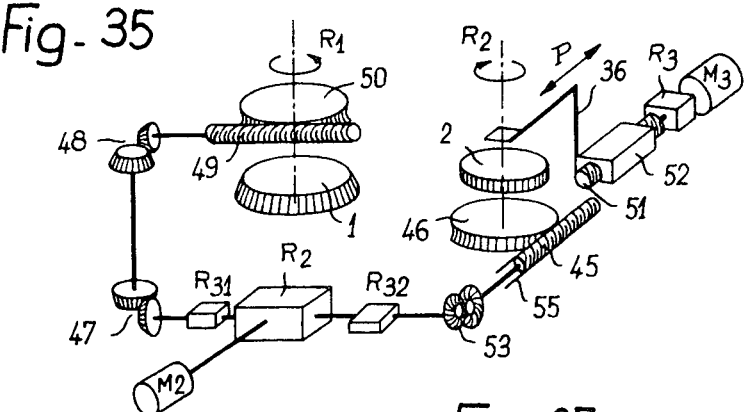
Figure 36:
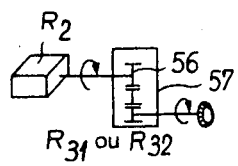
Figure 37:
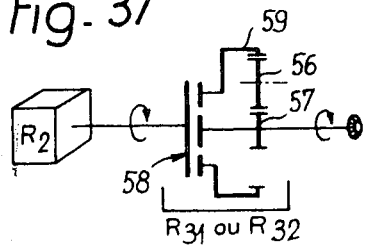
Figure 38:
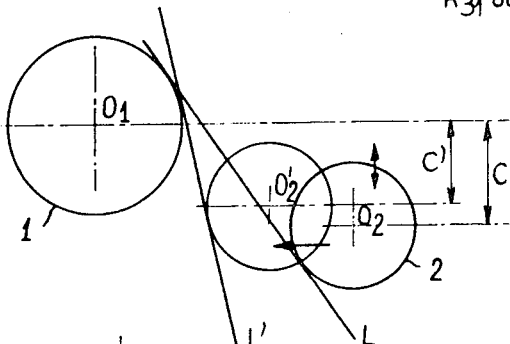
Figure 39:
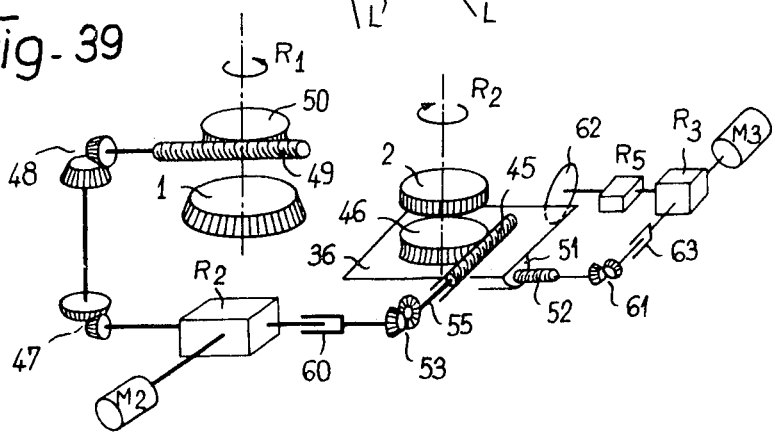

FIGS. 17 and 18 also show a modified form of embodiment of a machine for milling pinions by using a hob according to the method of this invention, wherein the inclination of the set angle controlling the orientation of the hob takes along a circular guideway or arcuate groove having the centre of its pivot axis located in the working zone of the milling cutter supporting head;

FIG. 19 shows diagrammatically and by way of example a typical form of embodiment of the kinematic chain of a machine of this type;

FIGS. 20 and 21 illustrate diagrammatically in perspective and in plane view from above the machine for cutting gear teeth having involute outlines;

FIGS. 22 and 23 illustrate typical examples of kinematic chains of a similar machine;

FIG. 24 is a diagram illustrating the dip-cutting performed by the tool, the axis of rotation of the workpiece remaining stationary;

FIG. 25 is a similar diagram showing the dip-cutting movement performed by the workpiece, the axis of rotation of the tool remaining stationary;

FIGS. 26 and 27 are diagrams illustrating the dip-cutting operation performed by the tool, with an additional differential rotational movement applied to the workpiece in the case of FIG. 26 and to the tool in the case of FIG. 27;

FIGS. 28 and 29 are diagrams illustrating the dip-cutting operation performed by the workpiece or blank, and with an additional differential rotation applied to the tool in the case of FIG. 28 and to the blank in the case of FIG. 29;

FIG. 30 is a diagrammatic perspective view showing a typical machine arrangement wherein the dip-cutting movement is applied to the tool;

FIG. 31 is a diagrammatic perspective view showing a machine arrangement wherein the dip-cutting movement is applied to the blank;

FIG. 32 is a modified form of embodiment of the arrangement shown in FIG. 30;

FIG. 33 is a modified form of embodiment of the arrangement shown in FIG. 31;

FIG. 34 is a diagrammatic perspective view showing a kinematic chain for controlling the generating and dip-cutting movement of the tool holder;

FIG. 35 is a diagrammatic perspective view showing a kinematic chain for controlling the generating and dip-cutting movement of the blank holder;

FIGS. 36 and 37 are diagrammatic detail views showing an additional rotational system adapted to be used in the case illustrated in FIGS. 34 and 35;

FIG. 38 is a diagrammatic illustration of a modified arrangement for side-cutting teeth of any desired outline, and FIG. 39 is a diagrammatic view of the kinematic chain for controlling a machine corresponding to the modified structure illustrated in FIG. 37.

Figure 1:
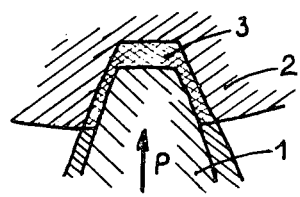
FIG. 1 illustrates diagrammatically a tool and workpiece contour, as well as the cross-section of the corresponding chip, in the case of a conventional direct front-feed.
Figure 2:
FIG. 2 illustrates the characteristic configuration of the resulting chip.

Referring first to FIG. 1, the direct dip-cutting or front-feed movement of a tool 1 into a workpiece or blank 2 leads to the removal of a chip having a cross-sectional contour 3 and a free shape as shown in FIG. 2.

Figure 3:
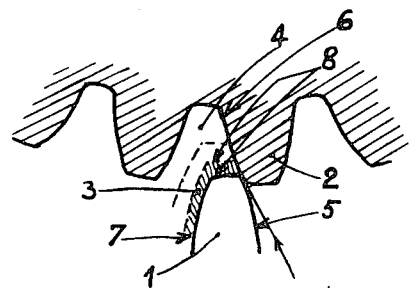
FIG. 3 illustrates the type of tool feed produced with the method of this invention.

In FIG. 3, a tool 1 cuts a groove 4 in a workpiece or blank 2 according to the method of this invention. The tool flank 5 engages tangentially the flank 6 to be machined in workpiece 2. The flank 7 and front 8 of the tool are adapted to remove material according to an outline corresponding to the surface 3, the latter being obtained by the feed produced between two successive tool passes.

Figure 4:
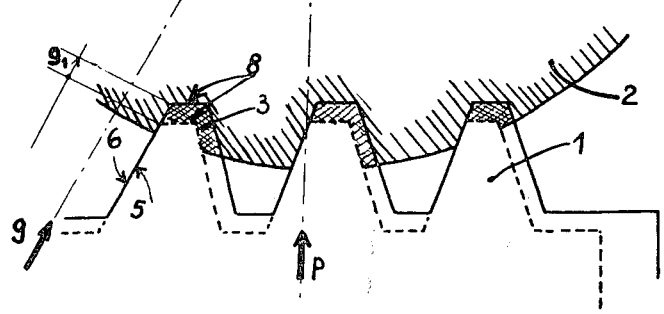
FIG. 4 illustrates diagrammatically an exemplary to the application of the method of this invention in the case of a machining operation without generation (milling, slotting, broaching) by axial front-feed or dip-cutting with a tool inclination.

The example illustrated in FIG. 4 shows the application of this invention to a machining operation without generating movement by hob milling, slotting or broaching.

Instead of the axial movement of penetration in the direction P, the tool 1 engages the blank 2 in an oblique direction 9 parallel to the cutting side faces 5 and 6 of the tool and blank, with an angle referred to as the "set angle". A feed movement $9_1$ causes material to be removed from the blank through a surface corresponding to the outline 8. The oblique feed 9 may be the resultant of a direct dip-cutting movement p and of a lateral movement of translation, or of a simple direct dip-cutting movement p combined with a tool inclination bringing its flank 5 parallel to the direction P.

Figure 5:
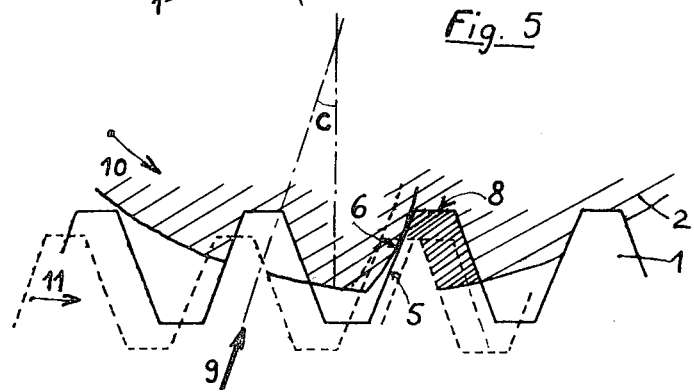
FIG. 5 shows another exemplary illustration of a machining procedure with a generating movement.

The example of FIG. 5 shows the application of the method to the machining with a generating movement, by hob milling, slotting or broaching.

Figure 6:
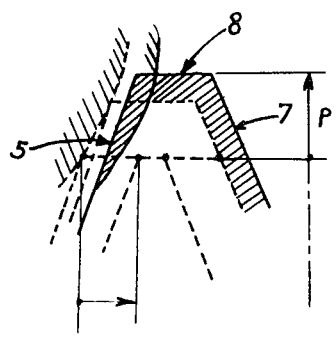
FIG. 6 shows, by comparison, the chip contour obtained by using the conventional dip-cutting or front-feed method.
Figure 7:
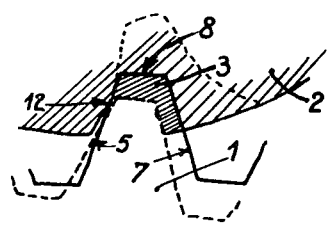
FIG. 7 shows the contour of a typical chip configuration obtained with the tangential oblique feed movement.

The elements of the preceding example are completed in this case by the generating movements 10 and 11 of the blank and tool. Whereas in the machining with generation and direct dip-cutting p of FIG. 6 and three-sided chip resulting from the simultaneous removal of material from faces 5, 7 and 8 is obtained, FIG. 7 shows a chip section 3 obtained by the method shown in FIG. 5. A slight point 12 of this chip is formed by the cutting edge 5 but is obviously negligible in comparison with the chip removed by the other side and the front edge 8, due to the generating movement.

Figure 8:
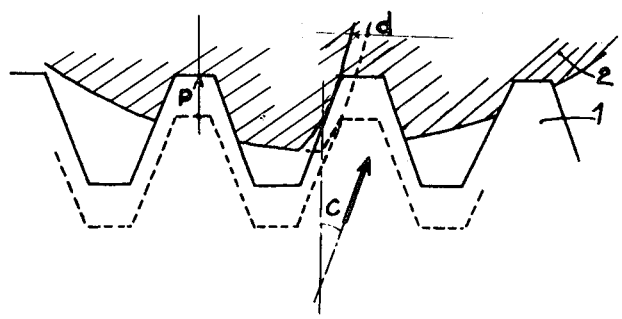
FIG. 8 shows a third example in which the feed or dip-cutting movement is combined with a movement of differential rotation or translation of the tool or workpiece, in the case of a piece of revolution, without any generating movements.

The example illustrated in FIG. 8 is an application of the method of this invention in the case of a blank or workpiece consisting of a body of revolution to which a differential movement of rotation or translation d is applied in combination with the dip-cutting movement or feed p of the tool which may be direct or oblique wiht a set angle c. The movement of differenatial rotation of the blank corresponds to a slight generating movement of its contour during the dip-cutting movement p of the tool. The chip outline 3 thus obtained is shown in FIG. 7.

Figure 9:
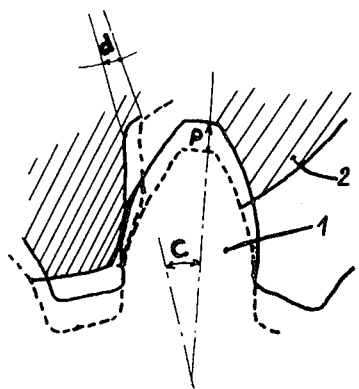
FIG. 9 shows a fourth example derived from the preceding one, wherein a generating movement is imparted to the workpiece and combined with a movement of differential rotation, while an oblique dip-cutting movement is imparted to the tool.
Figure 10:
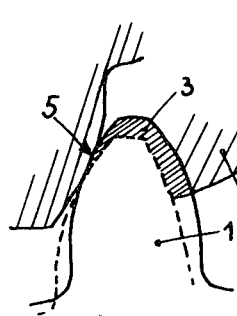
FIG. 10 shows the chip contour obtained in this case.

In the example illustrated in FIG. 9 the movements of the preceding example are combined with a differential generating movement between the tool and workpiece, the tool forming during its dip-cutting movement a set angle c with respect to the axial workpiece-tool plane. The relative workpiece-to-tool movement thus obtained will remove a chip having a thin point 5 on the side where the tangential penetration takes place (FIG. 10), which is similar to the point formed in the case of FIG. 7.

Figure 11:
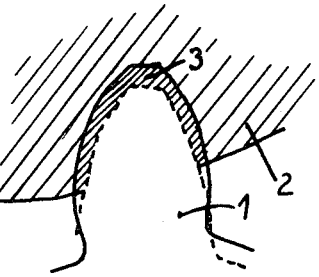
FIG. 11 shows by comparison the contour of a chip obtained by performing a similar machining operation according to a conventional workpiece-tool generating movement.

By comparison, FIG. 11 shows the chip outline obtained by machining with a conventional generating movement between the workpiece and the tool.

Figure 12:
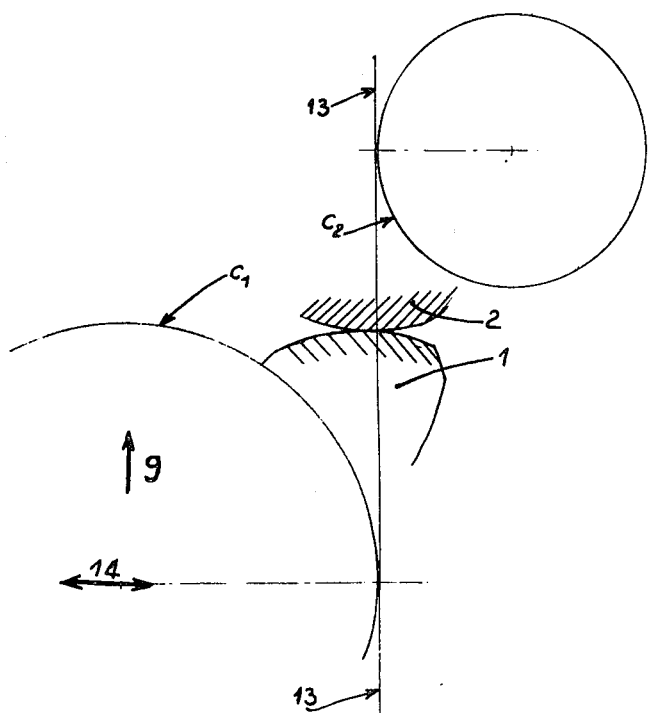
FIG. 12 shows an exemplary application to the cutting of gear teeth having an involute curve contour.

The example illustrated in FIG. 12 is applicable to the cutting of gear teeth having an involute curve outline. The tool 1 and blank 2 are represented diagrammatically by their base circles $C_1$ and $C_2$, whether nominal or corrected. The dip-cutting movement 9 is performed in a direction parallel to the tangent 13 common to the base circles. The additive movement of differential rotation produced during this dip-cutting movement is obtained by moving either the tool or the workpiece. It is directly proportional to the feed rate of said dip-cutting movement 9. If a constant rate is used, the differential rotation is also constant. This constant differential shifting may be obtained by using simplified means in contrast to the differential movements of the preceding examples.

The "beat" movement 14 for clearing or disengaging the tool from the workpiece takes place at right angles or obliquely to the direction of the dip-cutting movement of tangent 13, so that the tool cutting edge will clear the workpiece in the direction more propicious to the return or upward movement of the tool. The workpiece continues to rotate during the upward movement of the tool, as the latter is guided by its clearing cam. The displacement line tangent to the outline definitely prevents any heeling, in contrast to the other methods wherein a kinematic connection is necessary between the dip-cutting movement and the clearing movement.

The dip-cutting movement may take place in a direction opposite to the direction 13 with a tool 1 disposed symmetrically in relation to the axial plane of the workpiece perpendicular to the horizontal tangent 13.

Figure 13:
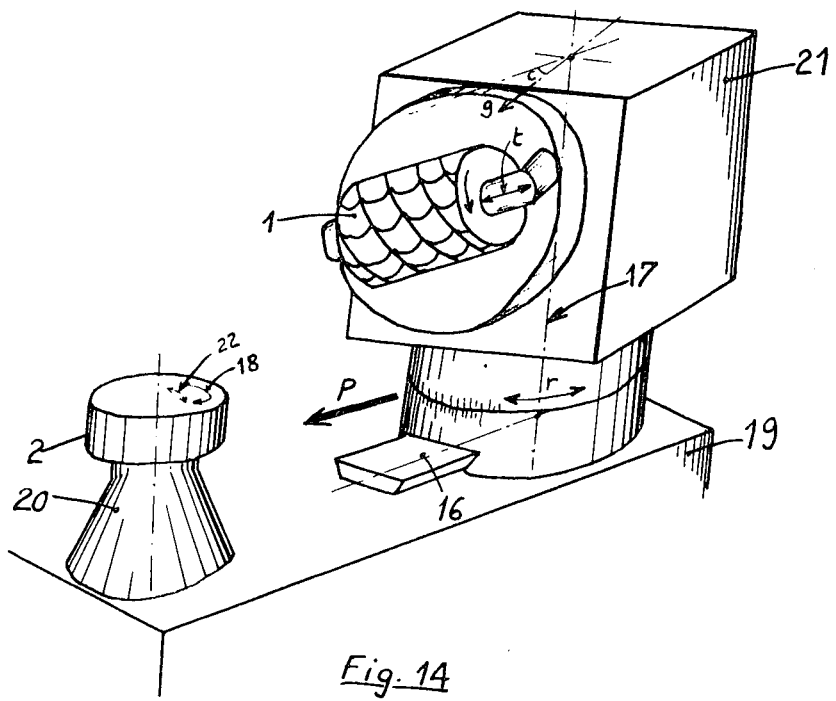
FIGS. 13 and 14 show in diagrammatic form a typical example of a hobbing machine for carrying out the method of this invention.
Figure 14:
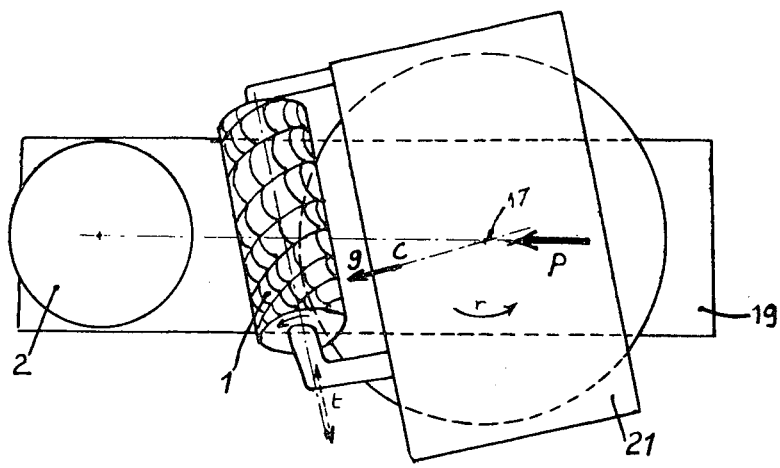

FIGS. 13 and 14 illustrate diagrammatically in perspective and in plane view from above a hobbing machine operating according to the method of this invention and comprising a frame structure 19, a workpiece holder 20 and a hob holder 21. The conventional cutting movements are not shown for the sake of simplification. They are completed by a dip-cutting movement p along the guideway 16, possibly in combination with a movement of translation of the milling cutter t, involving a resultant oblique dip-cutting 9 according to the selected set angle c. A dip-cutting direction p combined with an orientation according to the cutter angle C will lead to a machining operation of the type illustrated in FIG. 4.

The complementary movement of translation t of the cutter along its axis of rotation during the dip-cutting movement is advantageous whenever the machine does not comprise means for adjusting the rotation r or the differential rotation 18. This machine can be used for cutting teeth or grooves according to the above-described examples.

Figure 15:
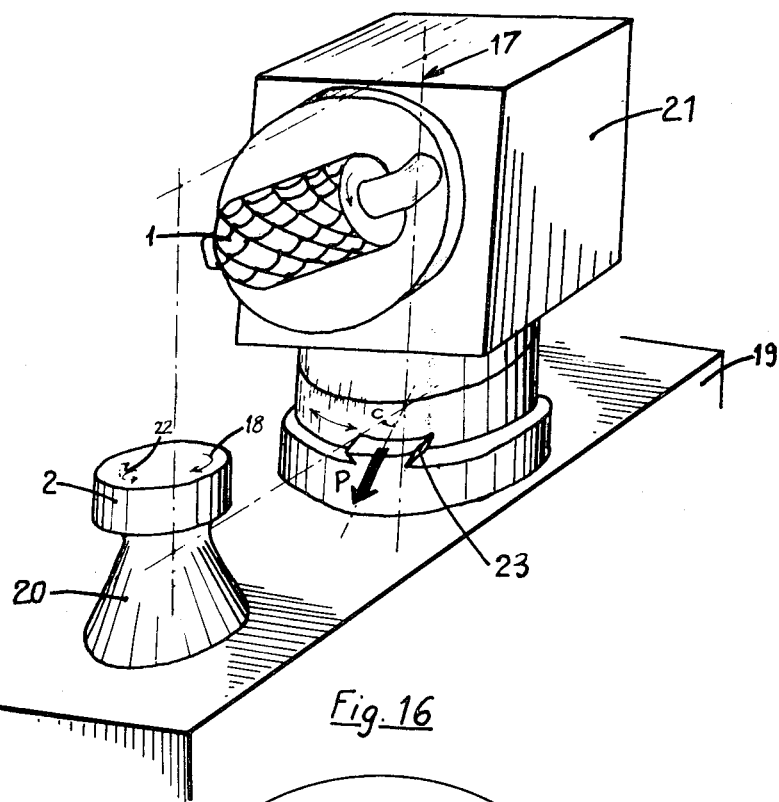
FIGS. 15 and 16 show a modified form of embodiment of the machine shown in FIGS. 13 and 14.
Figure 16:
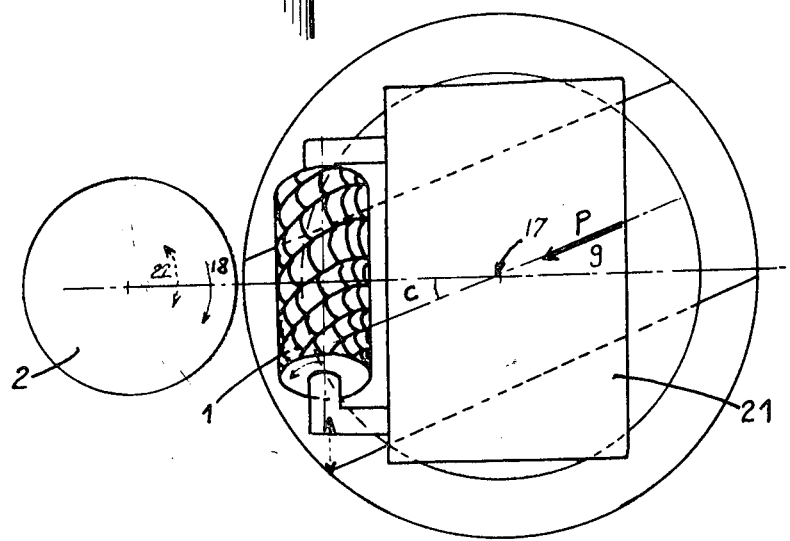

The milling machine illustrated in FIGS. 15 and 16 constitutes a modified form of embodiment of the preceding one, wherein the dip-cutting guideway 16 is replaced by an adjustable guideway 23 giving the set angle c of dip-cutting movement 9. With this arrangement the construction of the machine is greatly simplified.

The milling machine illustrated in FIGS. 17 and 18 constitutes a modification of the preceding ones, wherein the inclination of the tool holder 21 according to the set angle c determining the direction of relative dip-cutting of workpiece 21 in relation to the hob 1 takes place along a circular guideway 24 about a pivot movement axis 25 located at the intersection of the front working plane of the hob with the axial plane of workpiece 2 and tool holding head or slide 26 moving along the longitudinal slideway 16 in the dip-cutting direction p.

This arrangement constitutes an alternative to the movement of translation of the workpiece holder 20 perpendicularly to the axial plane of the workpiece and tool holder slide, in the direction 27, to permit the centering of the milling zone after setting the milling cutter head in the arrangements of FIGS. 13, 14 and 15, 16. In the last instance the transverse movement of translation 27 of the workpiece holder is no more necessary.

FIG. 19 shows by way of example a typical form of embodiment of a kinematic chain of a hob machine for milling pinions, according to the method exemplified hereinabove (FIGS. 4, 5, 8 and 12).

A direct-current motor $Mp$ driving a reduction gearing $Rp$ rotates a lead screw 28 transmitting the longitudinal dip-cutting movement P to a nut E connected to the tool-holder slide 26 (FIG. 17) movable along slideway 16 (FIGS. 13 and 17).

On the other hand, another motor $M_1$ drives a reduction gearing $R_1$ having one output shaft 29 adapted via a train of dividing gears $D_1$, to drive in turn the holder of workpiece 2 by means of a worm 30 and tangent gear 31.

Another output shaft of reduction gearing $R_1$ rotatably drives through a bevel gearing 32 to the hob 1.

Another motor $M_S$ coupled to a counter-motion and reduction gearing S, also referred to as the shifting mechanism, is adapted to control the movement of said hob 1 along its axis.

FIGS. 20 and 21 illustrate diagrammatically in perspective view and plane view from above a machine for cutting teeth having an involute curve outline (according to the method of FIG. 12) by slotting, a pinion-tool 1 being used to this end.

The tool holder slide enclsoing the mechanisms for producing the vertical beating and disengaging the tool from the workpiece is swivel mounted and adapted to pivot on a slide 32 movable along a slideway 33 parallel to the tangent 13 common to both base circles $C_1$, $C_2$, whether nominal or corrected of the tool and workpiece, as in the example shown in FIG. 12.

The slideway 33 is an integral part of a transverse table 34 movable longitudinally along the bed 35 of the machine which carries the holder 20 of workpiece or blank 2.

The inclination according to the angle I or pressure angle between the tool and blank of the tool holder $21_1$ permits adjustment of the disengagement movement of tool 1. This inclination may be directed in one or the other direction according to whether the tool 1 operates in the position of base circle $C_1$ or circle $C'_1$ (FIG. 21).

In the example illustrated in FIG. 12 the dip-cutting movement P is obtained by controlling a movement along the slideway 33 and the disengagement beating 14 along the bed 35 which, in combination with the inclination of the pressure angle I, can give a beating movement having the best possible oblique direction b for releasing or disengaging the tool.

The variation in the pressure angle I permits modification of the involute curve adhered to by cutting along a line of action inclined in relation to the tool action.

FIG. 22 illustrates diagrammatically the kinematic chain of the beating and tool-disengaging movements controlled from a motor $M_1$ driving a two-output gearing for reducing the cutting speed, one output shaft 36 of said reduction gearing actuating the crankshaft mechanism 37 for vertically reciprocating the tool 1, the other output shaft 38 driving the tool disengaging cam 39.

FIG. 23 illustrates the kinematic chain for controlling the generating or dip-cutting movement between the tool and workpiece.

A generating feed motor $M_2$ drives a train of reduction gears $R_2$ of which an output shaft drives a worm 40 driving in turn the workpiece 2 through a worm wheel 41.

A dip-cutting feed adjustment motor $M_3$ drives a train of dip-cutting feed gears enclosed in a case A which drives in turn a dip-cutting screw 42 the movement of which is transmitted to a nut 43 operatively connected to the tool holding head 32 (FIG. 20).

An opposite output shaft from reduction gearing A drives the train of wheels enclosed in a case D and adapted to produce the complementary generating feed movement, also in direct operative connection with another case $R_2$ enclosing the train of gears or dividing gears for producing the workpiece generating movement.

The resultant differential generating movement is transmitted from gear case D to bevel gearings 44 and 45, worm 46 and worm wheel 47 rotating the tool 1.

FIGS. 24 and 25 illustrate in detail the relative positions of the cut piece 2 and tool 1 according to whether the dip-cutting movement P is carried out on the tool (FIG. 24), with the workpiece axis stationary, or on the workpiece (FIG. 25), with the tool stationary.

This dip-cutting movement P takes place parallel to the line of action L perpendicular to the longitudinal axis of the machine and tangent to the base circles of the tool and workpiece, denoted $C_1$, $C_2$, or $C'_1$, $C_2$, or $C_1$, $C_2$, or $C_1$, $C'_2$. The distance from a center $O_1$ or $O_2$, to the straight line having the dip-cutting direction P passing through the other center ($O_2$ or $O_1$), is always equal to the sum of the radii of the base circles. It corresponds to the tool set angle C in relation to the workpiece.

The beating movement B can take place at right angles to the line of action L or obliquely with the inclination (angle $\hat{I}$ or $\hat{I}'$) not greater than the pressure angle of the tool, in order to obtain a beating direction more propitious to the tool disengagement.

This inclination denoted by the angles I and I' in FIGS. 24 and 25 is directed in one or the other direction according to the relative positions of the base circles of the tool and blank in relation to the longitudinal axis of the machine and to the line of action L.

A typical mode of actuation of the above-defined vertical beating movement and tool disengaging movement is illustrated in FIG. 22.

The flank followed by the cutting tool according to the method of this invention, depending on the relative positions of the base circles, is either the left-hand flank g2 or the right-hand flank d2 of the workpiece, g1 and d1 designating likewise the left-hand and right-hand flanks of the tool, in FIGS. 24 and 25.

FIGS. 26, 27, and 28, 29 further illustrate the determination of the additional rotation impressed either to the workpiece or blank (FIGS. 26 and 29) or to the cutter (FIGS. 27 and 28) according to whether the dip-cutting is performed by the cutter (FIGS. 26 and 27) or by the workpiece (FIGS. 28 and 29). Of course, if desired, the directions of rotation noted in the figures for clearly illustrating the manner in which these additional rotational movements are obtained may be inverted.

Due to the geometrical properties of the teeth having an involute curve outline, the additional rotation, whether it is applied to the pinion-tool or to the blank, is proportional to the dip-cutting movement.

In the case illustrated in FIGS. 26 and 28:

FIG. 26, the dip-cutting movement is performed by the cutter, the additional rotation being applied to the workpiece;

FIG. 28, the dip-cutting movement is performed by the workpiece and the additional rotation is applied to the cutter; therefore, the following formulae, wherein $\theta_1$ and $\theta_2$ denotes the angular velocities of rotation of the tool and workpiece, respectively, are obtained:

| | FIG. 26 | FIG. 28 |
|---|---|---|
| Dip-cutting | $P=O_1O'_1$ | $P=O_2O'_2$ |
| Rotational speed ratio at beginning of dip-cutting | $(\theta_2+d\theta_2)/\theta_1$ | $\theta_2/(\theta_1+d\theta_1)$ |
| Rotational speed ratio at the end of dip-cutting | $\theta_2/\theta_1$ | $\theta_2/\theta_1$ |
| Additional rotation | $d\theta_2=P/Rb_2$ | $d\theta_1=P/Rb_1$ |

In the case of FIGS. 27 and 29:

FIG. 27, the dip-cutting movement and the additional rotation are applied to the cutter;

FIG. 29, the dip-cutting and additional rotation are applied to the workpiece;

These formula are then as follows:

| Dip cutting | FIG. 27 | FIG. 29 |
|---|---|---|
| | $P=O_1O'_1$ | $P=O_2O'_2$ |
| Rotational speed ratio at beginning of dip-cutting | $\theta_2/\theta_1$ | $\theta_2/\theta_1$ |
| Rotational speed ratio at the end of dip-cutting | $\theta_2/(\theta_1-d\theta_1)$ | $(\theta_2-d\theta_2)/\theta_1$ |
| Differential rotation | $d\theta_1=P/Rb_1$ | $d\theta_2=P/Rb_2$ |

FIGS. 30, 31, 32 and 33 illustrate diagrammatically machines for cutting teeth with involute curve outlines according to the method illustrated in FIGS. 24 and 26.

FIGS. 35, 36 and 37 illustrate diagrammatically the kinematic chains permitting the obtaining of an additional rotation proportional to the dip-cutting movement during the latter movement, i.e. during the initial or rough cutting, and possibly the obtaining of a finishing cutting operation during which the distance between centers from tool to workpiece (from pinion-tool to blank) is predetermined, the rotational ratio being the one shown in the above tables at the end of the dip-cutting phase.

FIG. 30 illustrates diagrammatically the machine wherein the dip-cutting movement is impressed to the tool.

The tool holder $21_1$ enclosing the vertical beating mechanism (stroke C) and the tool disengagement mechanism (stroke B) is mounted for swivel and pivotal movement on a slide 32 movable along a slideway 33 parallel to the tangent common to the nominal or corrected base circles of the tool and blank.

The slideway is carried by a transverse table 34 movable longitudinally along the bed 35 of the machine supporting in turn the workpiece holder 20 with its blank 2.

The dip-cutting movement P is obtained by displacement along he the 33. The tool disengagement in the direction A of movement of the transverse table 34 along the bed 35 is necessary to permit the removal of the workpiece 2 from its support 20 without any danger for the operator.

FIG. 31 illustrates diagrammatically the machine in case the dip-cutting movement is applied to the workpiece.

The tool holder $21_1$ is mounted for swivel and pivoting movement on the bed 35. The workpiece holder 20 with the blank 2 is mounted on a slide 36 movable along a slideway 37 parallel to the tangent to the base circles.

Slideway 37 is rigid with a transverse table 38 movable longitudinally along the bed 35.

The dip-cutting movement P is produced by movement along the slideway 37. The tool disengaging movement A is still provided but in this case it is fed to the transverse table 38 supporting the workpiece holder 36.

FIGS. 32 and 33 illustrate modified forms of embodiment of the assemblies shown in FIGS. 30 and 31, respectively.

FIG. 32 illustrates a machine wherein the dip-cutting movement P of the tool holding assembly 32 is performed along the slideway 33 rigid with the bed 35 of the machine, the tool disengaging movement being applied to a tool holding slide 39 movable along the bed 35.

FIG. 33 illustrates a machine wherein the dip-cutting movement of tool holder 36 is performed along the slideway 37 rigid with bed 35, the tool disengaging movement being applied to the tool slide 40.

FIG. 34 further illustrates a kinematic chain for controlling the generating and dip-cutting movement of the tool holder. A motor $M_2$ controlling the generating feed drives a train of reduction gears $R_2$ of which one output shaft drives in turn the worm 45 for rotating the workpiece 2 via the companion worm wheel 46, a device $R_{32}$, the arrangement and function of which will be described presently, being interposed between the reduction gearing $R_2$ and the worm 45, this device $R_{32}$ being operated in case the additional rotation is fed to the workpiece.

The generating movement is transmitted to the tool from gearing $R_2$ via another device $R_{31}$ of which the arrangement will also be described presently, this device being operated in case the additional rotation is performed by the tool, otherwise the drive takes place directly through bevel gears 47, 48, worm 49 and worm wheel 50 rotatably rigid with tool 1.

A direct-current motor $M_3$ drives another train of dip-cutting feed gears $R_3$ driving in turn a dip-cutting worm 51 the movement of which is transmitted to a nut 52 operatively connected to the tool slide 32.

This arrangement requires the provision of an operative connection between the worm 49 and the bevel gears 48 via interfitting splined shaft portions 54.

FIG. 35 shows the kinematic chain for producing the generating movement and the dip-cutting movement of the workpiece.

The generating movement is transmitted to the tool through the same means, except for the operative connection between the bevel gear 48 and worm 49 which takes place directly.

The other output of reduction gearing $R_2$, also through the intermediary, if necessary, of the additional rotation system $R_{32}$, actuates the workpiece 2 via bevel gears 53, worm 45 and tangent worm wheel 46.

The direct-current motor $M_3$ drives the train of wheels $R_3$ driving in turn the worm 51 imparting a movement of translation to the nut 52 now operatively connected to the workpiece slide 36.

This requires an operative connection between the bevel gears 53 and the worm 45 through interfitting splined shafts 55.

So far as the machine performs only dip-cutting movements, the additional rotation being proportional to the dip-cutting movement, the aforesaid devices $R_{31}$ and $R_{32}$ consist simply of a train of gears 56, 57, as shown in FIG. 36, adapted if desired to be incorporated in the train of dividing pinions 56 and 57.

In practice, as the machine must perform a finishing revolution without any dip-cutting movement, these devices $R_{31}$ and $R_{32}$ may comprise as shown in FIG. 37 a controlled clutch designated diagrammatically at 58, which is operated either electrically or by cam means, and adapted to transmit the torque to an output shaft during the dip-cutting movement either through an internally-toothed gear 59 and planet and sun gears 56, 57, respectively, or directly during the finishing pass.

This finishing cutting will then permit the reshaping of the followed flank after having slightly shifted the tool in a lateral direction in relation to the workpiece in order to remove the ribs or lines corresponding to the successive dip-cutting passes along said flank. This arrangement requires the use of a reduced tool tooth thickness corresponding to this shifting.

As already explained in the foregoing, the train of wheels for producing the dip-cutting movement is then disengaged by means of a controlled clutch or coupling in order to perform this finishing pass without dipping the tool.

The above-described arrangements are applicable to the machining by tangential penetration in gear cutting systems using a line of action L having a fixed constant direction corresponding to gears of the involute curve outline type and permitting a considerable simplification of the kinematic chain of machine tools and a corresponding increment in the efficiency thereof.

In the case of teeth having a contour of modified involute curve or any other side contour, the machining by tangential penetration according to this invention cannot be performed as in the preceding cases with an additional relative rotation proportional to the dip-cutting movement between tool and workpiece, along a fixed line of action, as illustrated in FIGS. 24 to 27.

In these gear cutting systems the direction of the line of action L is variable in relation to the axis of the frame structure of the machine, and the rotation is no more proportional to the dip-cutting movement.

In this case, according to another feature characterizing this invention, the conditions of a tangential tool penetration are restored with a constant dip-cutting movement, by varying the set C, heretofore constant, according to a law of variation restoring the tangential cutting and enabling the tool to follow the flank of the contour to be obtained according to the method of this invention.

Thus, the cam-controlled displacement of the workpiece-supporting table will ensure the desired set variation for following the flank as a function of the dip-cutting movement, which will remain unchanged. The tool rotation and the workpiece rotation will be obtained through a fixed train of division gears.

The principle of this cutting method, as shown diagrammatically in FIG. 38, involves two successive positions of the workpiece centered at $O_2$ and $O'_2$ corresponding to two positions L and L' of the variable line of action connected to the contour to be obtained and resulting from the variation of the set C from C to C'.

In this respect it may be noted that the set C is the distance $O_2$ to the longitudinal axis comprising the center $O_1$ of the tool.

The dip-cutting direction is henceforth parallel to the longitudinal axis of the machine (movement A of FIG. 31).

To one flank of the workpiece there corresponds a law of variation of said set, as a function of the dip-cutting movement.

FIG. 31 corresponds to a machine arrangement providing this type of machining wherein the dip-cutting pass is performed this time along the bed 35, and wherein the set variation will take place along the slideway.

FIG. 39 illustrates the kinematic chain of this machine.

The motor $M_2$ drives a train of division wheels $R_2$ transmitting the torque to the tool 1 via bevel gears 47, 48 and a worm and wheel gear 49, 50. This motor $M_2$ also drives the workpiece 2 through interfitting splined shafts 60, bevel gears 53, interfitting splined shafts 55, worm 45 and wormwheel 46, the workpiece supporting table 36 being movable in this example.

The motor $M_3$ drives table 36 to effect the dip-cutting movement via a train of wheels $R_3$, another pair of interfitting splined shaft 63 (as the set is variable), bevel gears 61, worm 52 and nut 51 rigid with the table.

The motor $M_3$ causes the set to vary through the medium of a train of wheels $R_5$ at the output end of train $R_4$ and through a cam 62 reproducing in this example the law of variation of the set.

Although different forms of embodiment of this invention have been described and illustrated herein, it will readily occur to those conversant with the art that many modifications may be brought thereto without departing from the spirit and scope of the invention as set forth in the appended claims.

What is claimed as new is :

1. A method of making gears with teeth having involute curve contours by machining a workpiece with a pinion-tool, said workpiece having a first base circle and said tool having a second base circle, comprising:
   a. positioning said workpiece and said tool spaced apart from each other, said first and second base circles being positioned on a tangent line common to said first and second circles;
   b. moving said tool relative to said workpiece in a direction parallel to said common tangent line;

c. contacting said tool and said workpiece while moving said tool relative to said workpiece to perform dip-cutting; and d. rotating said workpiece and said tool during the dip-cutting movement, said tool and said workpiece being differentially rotated and said differential rotation being proportional to the speed of the dip-cutting movement.

2. The method of claim 1 comprising moving said tool relative to said workpiece at a constant speed and differentially rotating said tool and said workpiece at a rate which is uniformly proportional to the dip-cutting movement.

3. A method of making gears with teeth having a contour other than involute by machining a workpiece with a pinion-tool comprising:

a. positioning said workpiece and said tool spaced apart from each other;

b. rotating said tool and said workpiece at a constant rotational speed;

c. moving said tool relative to said workpiece at a constant rate;

d. contacting said tool with said workpiece while rotating said tool and workpiece to perform dip-cutting; and e. varying the distance between the centers of said tool and said workpiece during dip-cutting, said distance being taken perpendicular to the dip-cutting movement and being varied proportionally to the dip-cutting movement whereby said tool penetrates into said workpiece in a plane tangent to the contours being generated.

* * * * *